United States Patent [19]
Altenburg et al.

[11] Patent Number: 6,092,473
[45] Date of Patent: Jul. 25, 2000

[54] MODULAR ELEMENT AND MANUFACTURING PROCESS

[76] Inventors: Klaus Altenburg, St. Jobster Str. 8, D52146 Würselen; Franz Peter Goerres, Im Felde 28, D-52249 Eschweiler; Hans-Dieter Kreutz, Goyleystrasse 30, D-52146 Würselen, all of Germany; Hans-Wilhelm Strauch, Am Römerweg 17, B-4731 Eynatten, Belgium; August Dederichs, An der Weingass 36, D-52072 Aachen; Michael Zimmermann, Middeldorferstrasse 33, D-52066 Aachen, both of Germany

[21] Appl. No.: 09/043,676
[22] PCT Filed: Oct. 2, 1996
[86] PCT No.: PCT/DE96/01896
§ 371 Date: Mar. 25, 1998
§ 102(e) Date: Mar. 25, 1998
[87] PCT Pub. No.: WO97/14596
PCT Pub. Date: Apr. 24, 1997

[51] Int. Cl.$^7$ .................................................. B61D 17/00
[52] U.S. Cl. .......................... 105/404; 105/396; 105/409; 105/411
[58] Field of Search ..................... 105/355, 396, 105/397, 399, 401, 404, 407, 409, 411; 52/578, 580, 582.1, 583.1, 584.1, 589.1, 591.1; 220/1.5, 4.08, 4.09, 4.11, 4.17, 4.26, 4.33, 677, 682, 692, 393; 296/1.1, 10, 187, 191, 29; 403/335, 337, 338

[56] References Cited

U.S. PATENT DOCUMENTS

| | | | |
|---|---|---|---|
| 1,295,368 | 2/1919 | Pilkington | 105/409 |
| 2,052,739 | 9/1936 | Bailey | 105/409 |
| 2,373,808 | 4/1945 | Brown | 52/584.1 |
| 3,708,938 | 1/1973 | Tantlinger | 105/401 |
| 4,435,935 | 3/1984 | Larrea | 52/461 |
| 4,570,402 | 2/1986 | Johnson | 52/584.1 |
| 5,433,053 | 7/1995 | Tulloch | 52/582.1 |
| 5,664,826 | 9/1997 | Wilkens | 296/191 |
| 5,749,197 | 5/1998 | Jolly | 52/584.1 |

FOREIGN PATENT DOCUMENTS

| | | |
|---|---|---|
| 1108576 | 6/1961 | Germany . |
| 2031546 | 9/1971 | Germany . |
| 0573384 | 12/1993 | Germany . |
| 4410998 | 10/1995 | Germany . |
| 29519372 | 5/1996 | Germany . |
| 19538793 | 4/1997 | Germany . |
| 19619617 | 7/1997 | Germany . |

*Primary Examiner*—Mark T. Le
*Attorney, Agent, or Firm*—Liniak, Berenato, Longacre & White

[57] ABSTRACT

The invention relates to modular elements (1) of differential construction which are particularly suitable for constructing cold-joined large bodywork or containers. All the components of the modular elements, substantially shell (2), shaping frames (3), edge profile (5) and optionally stringers (4) extending transversely to the frames and acting as buckling resistors, are cold-joined to each other, e.g. by pressure joining, punch riveting and the like. As a result, firstly rapid production with good surface quality is achieved, and secondly different materials such as iron and non-ferrous metals, fiber reinforced plastics etc. can be freely combined in hybrid structures to construct the modular elements, the local arrangement of materials in the modular element having to be adapted to the desired mechanical properties. The structure described herein contributes substantially to mechanized, highgrade software-supported manufacture in which the geometrical data for the half-finished products of the modular elements can flow directly (on-line) from a CAD construction, thus achieving at the same time currently unobtainable flexibility when producing different external shape variants even for a low level of mass production.

19 Claims, 4 Drawing Sheets

MODULAR ELEMENT AND MANUFACTURING PROCESS

FIELD OF THE INVENTION

The invention relates to a modular element, in particular for constructing large bodies or containers, and to a process for its production.

DESCRIPTION OF THE RELATED ART

DE-A-44 10 998 describes a quick-assembly border-profile pair for modular elements in vehicle and container construction which comprises separate complementary positively locking strips by means of which the modular elements can be centred with respect to one another and joined temporarily. The definitive connection between the modular elements is produced by frictionally locking and positively locking fastening elements (cold-workable clinch bolts) which pass through abutting webs of the pre-joined border profiles and secure them against one another in a sheer-resistant manner and so that they are not displaced transversely. The interaction of the bolts and of the complementary positively locking border elements provides a torque-resistant connection of the modules. These modular elements provided for the construction of large bodies such as railway passenger carriages may advantageously be joined exclusively from the outside. There are therefore no restrictions to completion of the modules before joining, i.e. the interior work can be completed in modular fashion. However, the solid steel border profiles welded to the frame ends make the modular elements relatively heavy.

A carriage-body construction for railway passenger carriages which can be cold joined from inherently stiff wall modules, likewise prefabricated by welding, and is disclosed by EP-A-0 573 384 may be regarded as the preliminary stage of the first-mentioned prior art. Clinch bolts are likewise used for the purpose of connecting the wall modules to one another. In this case, the border profiles running in the longitudinal direction of the modules are formed integrally by sections bent off from the shell and are provided with rows of bores for the insertion of said clinch bolts. These border profiles produce bending and buckling stiffness for the wall parts. They also form the basis for the cold-joining methods and the connecting edges and planes when the various modules are joined together.

The Z-profile frames of the load-bearing framework butt flush against the border profiles; in each case two frame ends are located opposite one another. Via the joint between the two modules, the frames are connected directly to one another by a clinch bolt, which passes through two flanges of the frames and in each case one leg of the bent-off border profiles.

Because the clinch bolts are located behind the shell, the parting joint has to be accessible from the inside of the carriage during joining of the modules, in order that the tools may be attached from the inside. The free spaces required for the tool insert obstruct completion of interior work of the modules.

The border profiles of these previously known solutions have to be configured in pairs with complementary profiles, with the result that the opposite borders of the modular elements are designed differently. The flux of force in the parting joint between the modular elements runs essentially via the border profiles, at which the load-bearing frames or columns are connected flush by their ends.

SUMMARY OF THE INVENTION

The object of the invention, taking the abovementioned prior art as departure point, is further to improve quick-assembly modular elements in terms of their production and handling and to specify a process for producing such improved modular elements.

Taking the prior art mentioned in the introduction as departure point, the adjacent modular elements are now connected to one another directly in a positively locking and/or frictionally locking manner via frame feet, which also connect the ends of the frames indirectly to the border profiles.

Furthermore, a modular configuration of differential construction which, as a result of weld connections largely being dispensed with, is free of heat-related stressing is provided by the proposed features in that at least the sheet-like components of the modular elements are connected to one another only by shaping joining methods or punch riveting.

Shaping joining, stamping joining or pressure joining here refer to "autogenous" connections between two overlapping, relatively thin-walled components, or component surfaces, which are produced, in the overlapping region, by the introduction of a common local bulge or protrusion by means of a male die and a female die or the like, a type of push-button structure being produced by the local cold working of the components.

Punch riveting refers to a connecting method in which suitable rivets are pressed/punched, without prior drilling, through two overlapped, relatively thin-walled components (e.g. frame flange and shell) and, with cold working and partial penetration, these are fixedly connected to one another on a permanent basis. There is also a need here for a steady on the blind side. However, the punching rivet does not have to penetrate to the blind side.

The modular elements, which are preferably intended for the side wall, strip windows, roof haunches and roof of a large body, are of a length of up to 25 meters and are of basically identical or similar construction, are constructed on a framework of preformed frame profiles and stringer profiles which, if appropriate, connect these in a grid-like manner by cold joining. These stringer profiles are only inserted, as required, wherever buckling has to be avoided as the result of large sheet-metal panels.

For the purpose of minimising weight, the separate border profiles on the longitudinal borders of the modules are preferably produced from carbon-fibre or glass-fibre material (hybrid construction), but may, of course, also consist of metallic materials. It is preferable, but not absolutely necessary, for the shell of the modular elements to consist of a sheet-metal sandwich (two thin corrosion-resistant sheet-metal layers with plastic sheeting positioned therebetween). This material achieves functional integration of noise damping and corrosion protection.

Colouring and further-enhanced corrosion protection are preferably achieved by providing, last of all, a protective film which, moreover, covers, with a smooth surface, the hitherto visible punching-rivet heads located in the shell plane. Filling of the surface and internal coating with antinoise compound is no longer necessary thereafter, with the result that it is possible to achieve considerable financial savings with respect to the conventional shell design.

In the course of these developments, a differential modular-element design with frames or columns of closed cross-sections, in particular in the form of rectangular tubes, has proven particularly advantageous. These combine a number of advantages:

optimum cross-sectional shape for a programme-controlled adjustment of the longitudinal progression of the cut-to-length frame profiles by mechanical curling, by way of which outer contours for a large body which are curved as desired can be flexibly produced in an extremely short period of time;

weight optimization possible by piercing holes and/or producing trelliswork or latticework structures in the wall regions running transversely with respect to the shell by means of laser cutting;

specific reduction in cross-section and weight possible by fully cutting away wall sections in regions which are subjected to low loading, while maintaining the homogeneously closed connecting cross-sections at the ends;

good attachment of the frame feet, fastened at the frame ends, for connecting elements located in the parting joint between adjacent modular elements by virtue of weld seams, preferably laser weld seams, all the way round;

broad base for placing a shell panelling in position and fastening it by cold working (e.g. punch riveting) and, if appropriate, for attaching buckling-resistance means (stringers) running transversely with respect to the frames.

In addition to the construction of the modular elements themselves, particular attention has been given to the region of the transitions from the frames to the border profiles and the connections between the border profiles of adjacent modular elements which are to be joined to one another. Using a connecting method which is particularly suitable for this modular-element construction, the standardisation of the module (longitudinal) borders have also resulted in the assembly being markedly more simple and quick than in the prior art, at least the same mechanical strength being maintained for the connections. This connecting method is also suitable for connecting the modular elements to a metallic underframe structure. Finally, it is also possible for intermediate-floor elements of double-depth carriages, which have an H-shaped cross-section with floor and side-wall parts, to be integrated in the modular overall structure with the same border-side connections on the side-wall sides.

Once two modular elements have been joined together, the connecting means can all be joined from the same direction. In the construction of passenger-carriage bodies, this takes place, as has already been described in the prior art mentioned in the introduction, from the outside of the carriage body. All other joining work for connecting the prefabricated modules to one another is also carried out from the outside. As a result, all carcase-finished modules can be prepared such that, on the inside, they are ready for installation, e.g. with inner panelling, lines, windows.

Advantages of this construction and of these structural elements are quick assembly without any reworking, with the option of delivering vehicle bodies which are fully or partially dismantled and of final assembly once they have reached the customer, removal and separation of the modules for repair or recycling purposes (the cold-joined connecting means can be released with a relatively low degree of outlay by the exposed, outer closing heads being stripped off or sheared off. The bolts can then be driven inwards and the modules can be separated from one another);

reduction in outlay and in weight and improvement of the environmental compatibility during recycling as a result of the elimination of antinoise compound on the inside of the shell.

At least on that side of the components which is located on the outside in the assembled state, the parting-joint borders will be arranged so as to be sunken with respect to the main surface in a manner known per se, in order that the (closing) heads of the connecting elements do not project. These can be covered from view by a surface-flush covering strip or the like. In the case of a suitable configuration, this strip can likewise perform a function in the flux of force and moments in the parting-joint region, e.g. reinforcement against shear loading occurring along the parting joint.

In addition to the construction of side walls with horizontal parting joints, the associated modular connecting principle can also be used at vertical parting joints for the end-side connection of side-wall sections and of side walls with end walls or entire vehicle end units. At these locations, it may optionally be possible simply to remove the entire component once the connecting elements have been released. However, it will be necessary to provide, within the parting joint, positively locking elements which are capable of vertical load bearing, in order to assist the clamping forces of the axially clamped-together clamping pieces.

BRIEF DESCRIPTION OF THE DRAWINGS

Further advantages of the subject matter of the invention can be gathered from the drawing of an exemplary embodiment and of the detailed description of this which follows. In the drawing, with reference to modular elements of differential construction for producing large bodies.

DETAILED DESCRIPTION OF THE PREFERRED EMBODIMENT

Figure 1:
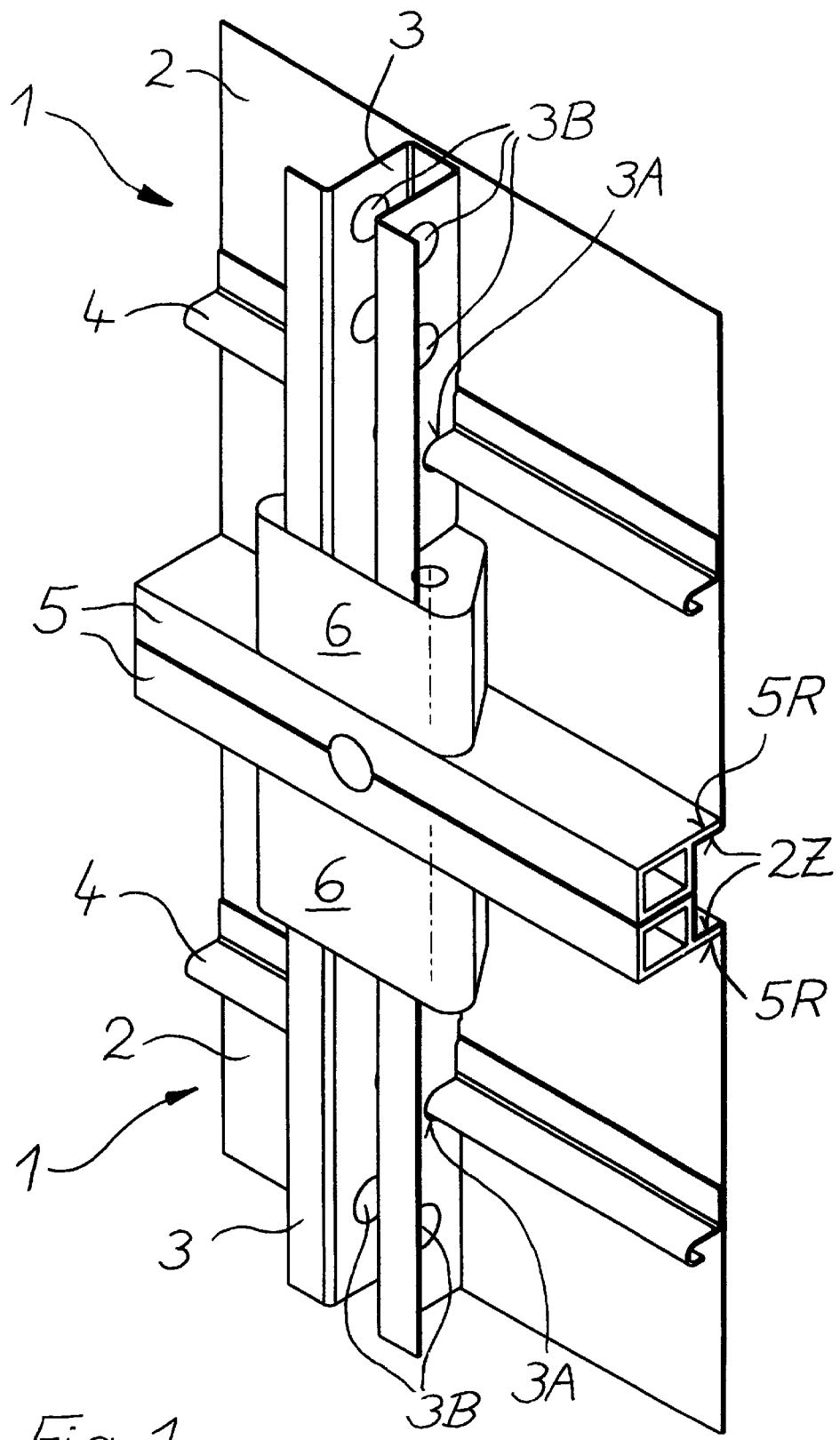
FIG. 1 shows a simplified perspective illustration of a detail of the parting-joint region of two adjacent modular elements from the inside of the body.

According to FIG. 1, each modular element 1 essentially comprises a shell 2 with border-side bent-off sections 2Z, shell-bearing frame profiles 3, if appropriate stringer profiles 4 which are connected crosswise to said frame profiles and are intended for stiffening the shell against buckling, and longitudinal border profiles 5.

The frames may be configured with a Z-shaped cross-section or hat-shaped cross-section. In the first case, one of the Z-flanges is provided, in a known manner, as a bearing surface for the shell of the relevant module; in the second case, which is the one illustrated here, the shell is placed in position on the central flange of the hat profile. The frame-profile flange or flanges directed away from this extend parallel to the shell 2 at a distance away from the latter which is determined by the profile web. These flanges can be used at a later stage for the purpose of fastening interior elements.

In another variant (see FIG. 3), the frame profiles 3 have a closed cross-section, preferably one in the form of a rectangular tube, at least at their ends in the region of the parting joint which butt against the border profiles 5.

The precisely cut-to-length, straight frame profiles 3 may, if necessary, be processed mechanically using suitable bending methods, preferably in a CNC-controlled manner, into a desired curved shape, which later describes the outer contour or enveloping curve of the body of the vehicle carriage in cross-section. Hereafter, preferably by means of laser cutting, the frame webs running perpendicularly with respect to the shell 2 can be provided with cutouts 3B for the purpose of reducing weight. If required, clearances 3A, approximately with the contour of the stringer profiles 4, are cut out, in the same operation, of the later shell-facing frame parts. Following the parallel alignments, and if appropriate following temporary fastening, of the frame profiles 3 on the longitudinal border profiles 5 in a simple supporting device, the stringer profiles 4, running perpendicularly with respect to the frames, are introduced, as appropriate, in the shell-side frame clearances 3A.

Figure 2:
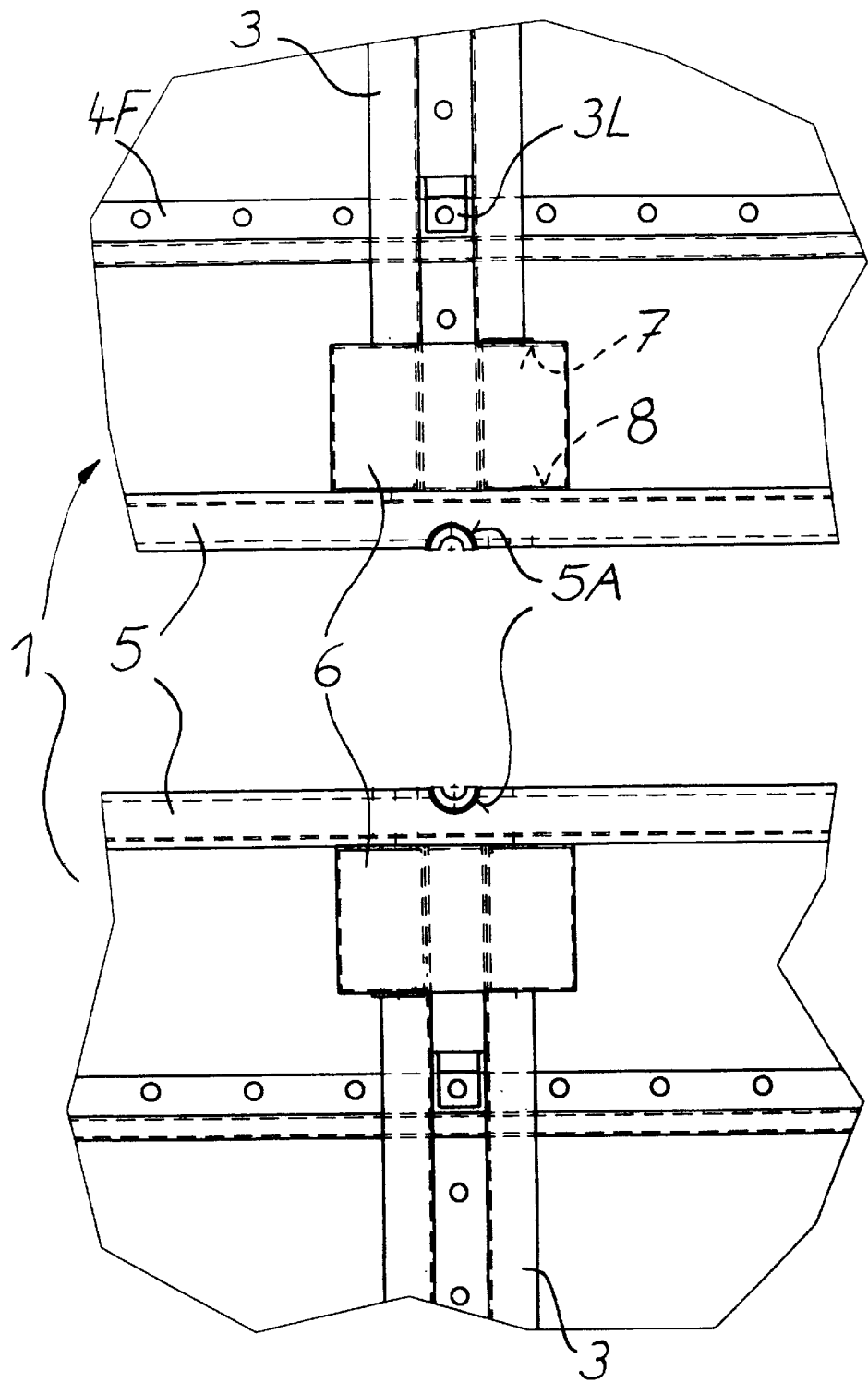
FIG. 2 shows a view of the detail according to FIG. 1 in which the two modular elements have been drawn apart from one another in order to illustrate the cold-joining connections.

As can be seen clearly in FIG. 2, a lug 3L still projects, in said frame clearances 3A, from the shell-facing web or flange, and can be connected to a flange 4F of the stringer profile 4 by stamping joining or punch riveting, indicated here by circles. The lug 3L is bent over slightly by the thickness of the stringer flange 4F. This results, in the points of intersection, in warp-free, shell-flush connections between the frames and stringers, with the result that these—together with the border profiles 5—form a load-bearing framework.

Said connections between the frames and the stringers can be produced very quickly and reliably using versatile tools.

The connections between the frame profiles 3 and the border profiles 5 of the modular elements 1, which are in the form of panels or are also bent in the transverse direction, are produced with the aid of so-called frame feet 6.

The frame feet 6 can be pushed on to the frame ends and fastened thereon in turn, in a manner which is not illustrated any more specifically, by cold-joinable, highly mechanized connecting means (shaping joining or stamping joining or punch riveting). As seen in the longitudinal direction of the frame profiles 3, they form joinable surfaces for producing fixed connections in the region of transition between the modules.

Since the frame-profile contour always remains the same within one module range, the frame feet 6, in the respectively required design, are standard mass-production parts which can be produced inexpensively in large numbers. They can be cut out precisely, for example, as boxes from sheet-metal panels with all the necessary clearances by means of laser cutting and, thereafter, bent, by cold working, into their definitive shape, in order to achieve a high degree of mechanization.

According to FIG. 2, the frame feet 6 have a top base 7 and a bottom base 8, the two preferably being spaced apart in parallel planes by a distance of a few centimeters. The respectively bottom base 8, which is closer to the border of a module, bears on the border profile 5 and is preferably riveted thereto; this connection may be arranged centrally in the central plane of the frame foot 6 or symmetrically on either side of the centre of the latter.

The border profiles 5 are preferably configured as closed rectangular glass-fibre or carbon-fibre box profiles with a rib 5R projecting in alignment with one of the walls. Starting from this basic shape, highly precise machining units are used, following the operation for cutting to the desired module length, to introduce apertures or through-passages in the border profiles 5 one after the other. For strength reasons, it is aimed to provide continuous carbon-fibre reinforcements predominantly in the cross-sectional regions which are not interrupted by these apertures. The selected differential construction using cold joining is combined with the advantage that materials can be selected as required in accordance with strength and lightweight-construction criteria and also different materials and semifinished products can be freely combined at the joining locations.

The sheet-metal shell sandwiches are precisely cut to length from the coil, adjusted to have parallel sides and provided with the bent-off sections 2Z on the longitudinal borders. On the one hand, these stiffen the modular elements, or the shell, on the longitudinal borders; on the other hand, once in each case two modules have been joined together, they form a longitudinal parting-joint channel, which will be discussed in more detail at a later stage in the text.

The shell 2 is then placed in position on the shell-facing flanges or webs of the frame profiles 3. Their bent-off borders 2Z are drawn over the ribs 5R of the border profiles 5. In the border region which is sunken with respect to the actual shell contour, the longitudinal borders of the sheet metal of the shell are connected directly to the border profiles 5 by riveting. At the location where the border of the shell 2 is laid over half-moon-shaped apertures 5A of the border profiles, it is also necessary to provide corresponding apertures in the shell; these can be introduced, using a laser-cutting installation, during the adjustment operation. Finally, the shell 2 is preferably fastened on the frames and stringers by flat-head punch riveting.

Once this module carcase has been completed, it is possible to begin further work on the inside, because the further construction of the carriage structure is, once again, carried out by cold joining. Should particular interfaces (e.g. line lead-throughs or the like) be necessary between modular elements, then these can either be provided in the end region of the modular elements or be realised by a suitable plug-in connection in the parting joint. In the case of the preferred assembly (and, if appropriate, dismantling) from the outside, any existing interior work will not be affected in any way, with the result that this work remains free of restrictions in the region of the joints. If need be, small free spaces will have to be provided to make it possible for the connecting and positively locking elements to be driven out inwards without obstruction if dismantling should take place.

Figure 3:
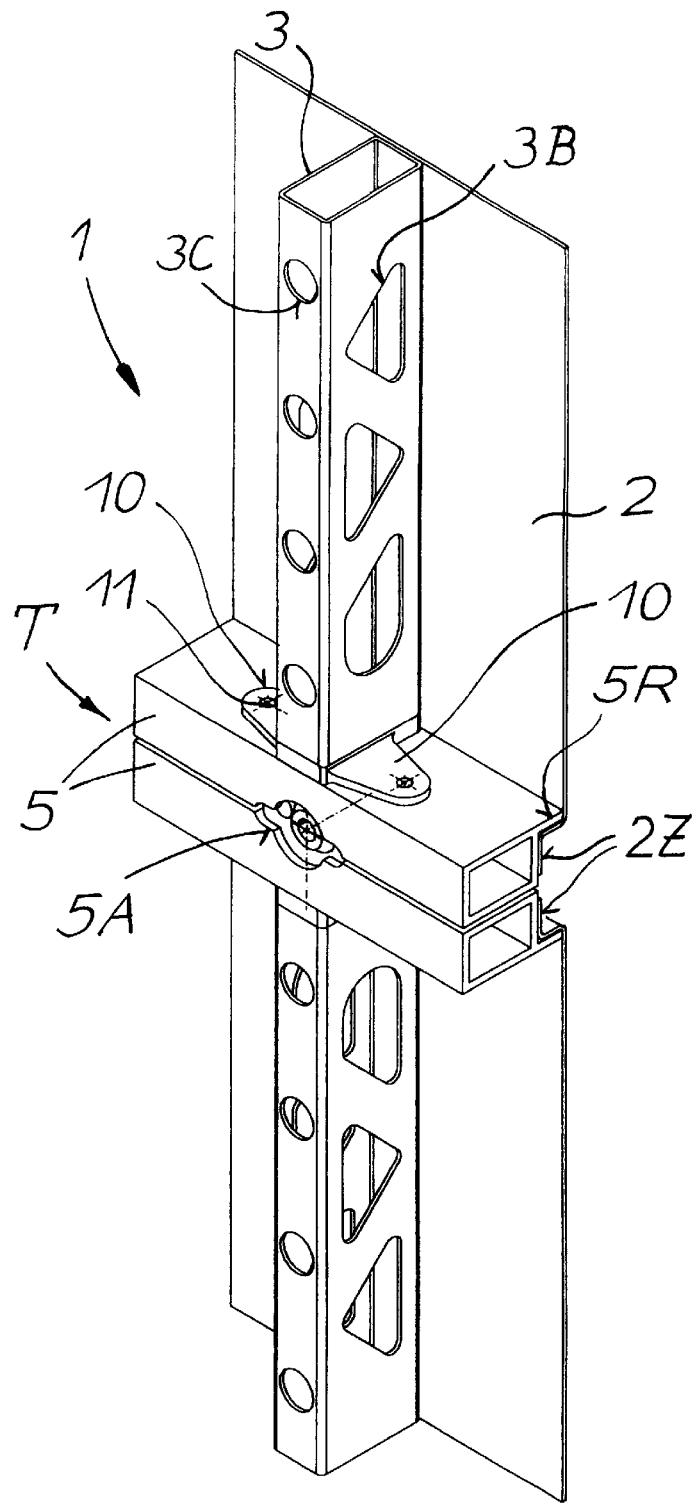
FIG. 3 shows a perspective view of a variant of a modular element with different designs for the frames and connecting elements.

According to FIG. 3 as well, each modular element 1 of cold-joined differential construction essentially comprises a plurality of frame profiles 3, which bear a shell 2, and longitudinal border profiles 5, which are to butt against one another along a parting joint T. If required, each component also contains stringers or buckling-resistance means which are arranged transversely with respect to the frames and parallel to the border profiles and are to be connected to the frame profiles and the shell in the manner described above.

The detail shown constitutes a single frame connection, which is to be arranged over the length of the parting joint T as many times as corresponds to the design load. The length of the parting joint is determined by the size of the components which are to be connected, it being possible for these, in the case of side walls of railway passenger carriages, to have a length of 20 m.

The abovedescribed CNC-controlled curling process can best be carried out in a warp-free manner using closed, symmetrical frame-profile cross-sections, so that it is preferred to have a continuous rectangular tube cross-section for the frame profiles 3, which provides, at the same time, sufficient bearing surfaces for the attachment of the shell and, if appropriate, of the stringers. Clearances or holes 3C are then to be introduced in the wall remote from the shell, opposite the punch-riveting locations, in order that it is possible for the steadies for the punch-riveting tools to be introduced. These holes are thus located in axial alignment with the riveting locations.

The clearances 3B in the frame-profile wall sections or webs directed perpendicularly with respect to the shell are designed here as triangles with rounded corners, this resulting in the remainder of the surface area, optimized in terms of weight and strength, being in the form of a latticework or trelliswork. However, in addition to the round configuration according to FIG. 1, it is also possible to provide other polygonal shapes (e.g. trapezia, rhombuses) for the clearances if this appears to be expedient; the additional outlay is negligible in production using laser cutting.

From the arrangement of the holes 3C in relation to the clearances 3B, it can be seen that the riveting locations are preferably situated in the region of those material accumulations of the lateral frame webs which are in the vicinity of the shell. Furthermore, in regions of the frame profiles 3 which are subjected to low loading, a specific reduction in cross-section and weight can be achieved by fully cutting away web or wall sections, while maintaining the homogeneously closed connecting cross-sections at the ends. Use can be made of welded rectangular tubes, whose longitudinal seam is to be arranged on the side remote from the shell.

Once again, the border profiles 5 are box-shaped glass-fibre or carbon-fibre profiles with a rib 5R projecting in alignment with one of the walls. In the region where the frame profiles and border profiles intersect, the apertures or through-passages 5A [lacuna] introduced in the border profiles 5 one after the other.

Once again, frame feet 6 of modified form are fixedly connected to the frame ends, on either side of the parting joint T. According to FIG. 4, which also shows a cross-section through a preferred form of connection between the modular elements, the frame feet 6 each have a short collar or stub 9 which projects in the direction of the frame and can be fitted into the closed tube cross-section of the frame end. Hereupon, it is connected to the respective frame profile 3 on a permanent basis by a weld seam all the way round. However, it would also be conceivable, in another embodiment, for the frame feet to be connected to the frame profiles 3 by means of relatively large material overlaps, once again using cold-joining connections. On either side of the stub 9 or frame profile 3, it is also the case (FIG. 3) that flanges 10 with bores 11 project perpendicularly from the frame feet 6 and are used to connect, preferably by riveting, the frame feet 6 to the border profiles 5 on either side of the through-passages formed therein.

Since the frame-profile contour always remains the same within one module range, the frame feet 6, in the respectively required design, are standard mass-production parts, and if appropriate standard factory parts, which can be produced inexpensively in large numbers. They may be produced, for example, as extremely high-precision castings.

For the parallel alignment of the frame profiles 3 and for fastening the frame feet 6 on the longitudinal border profiles 5, it is sufficient to use a simple supporting device in which first of all the respective border profile and then the frame profiles can be introduced, the apertures 5A which have already been formed in the border profile predetermining the frame positions.

Figure 4:
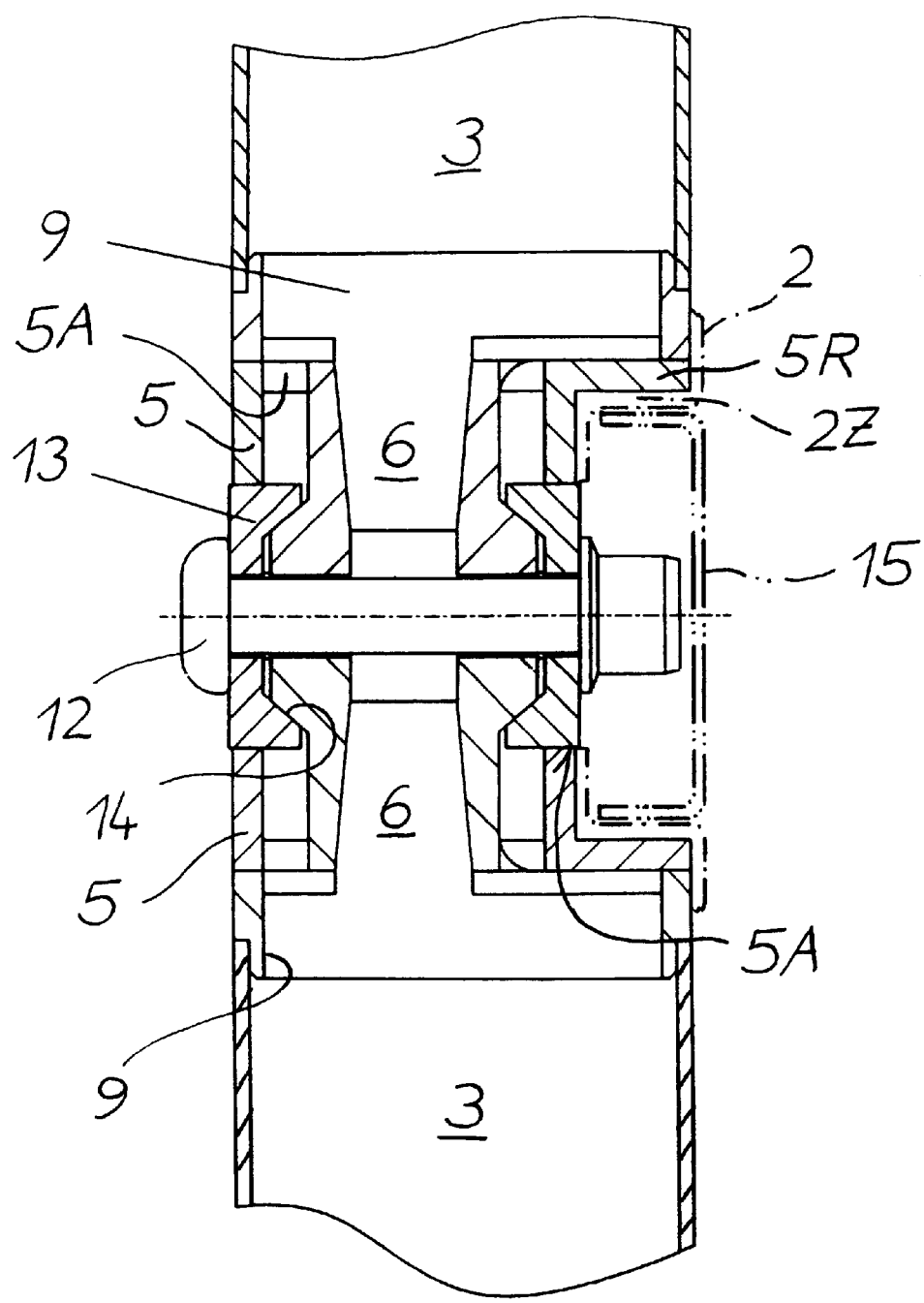
FIG. 4 shows a sectional view in the region of a connection between two modular elements according to FIG. 3.

As can easily be seen in FIG. 4, the modular elements can be connected to one another, via the pair of frame feet 6 in the parting joint T, by means of axially clampable connecting elements (e.g. locking-ring bolts with separate, press-on locking ring) 12. These are introduced in passages of the frame feet 6, said passages being formed from half-bushings. The connecting elements essentially comprise a cylindrical shank with an upset head and the locking ring. Before production of the connection, each locking-ring bolt additionally has a break-off drawing shank, which is not illustrated here. The connecting elements 12 interact with positively locking elements 13, 14 which span the parting joint and, when the connecting elements are clamped axially, produce a high prestressing force in the parting joint by virtue of a wedge action.

The projecting set heads and locking rings of the connecting elements are accommodated between the modules, in a sunken manner with respect to the shell contour as a whole, in the channel formed between the ribs 5R of the border profiles 5 by the border-side bent-off sections 2Z of the shell 2. Last of all, they are covered over by a covering profile 15 (as is indicated here by double chain-dotted lines, and preferably having a U-shaped cross-section) which closes the channel flush with the surface of the shell. The covering profile 15 itself may provide a further contribution to stabilising the parting joint between the modules against longitudinal sheering, in that it fits precisely into the parting-joint channel and its legs are adhesively bonded to the abutting bent-off parts of the shell sheet metal. If required, it may also be combined with a gutter in the region of transition from the roof to the side wall.

In dependence on the length of the parting joint, a plurality of connecting points according to FIG. 4 are formed, as has already been mentioned, and these connect to one another the ends of two abutting frame sections. Overall, in the case of a carriage body or large container, these can be used to form peripheral annular frames which run parallel at predetermined distances from one another. In the case of passenger-carriage bodies, the distance between the frames is influenced essentially by the window separation; it is not usually possible here to provide uniform distances; rather two frames are always provided on the borders of a window pillar which is narrower than the window cutouts enclosing it.

It is possible to arrange, in the parting-joint plane in the regions between the abovementioned frame-foot connections, yet further positively locking elements (not shown here), which, in the flux of force along the parting-joint plane, can absorb sheering forces, and if appropriate, also buckling forces directed transversely with respect to the latter. In the abovementioned passenger-carriage bodies, these are preferably to be arranged in the region beneath and above the window cutouts.

Between the abovedescribed connecting locations, it is possible for further cutouts to be formed in the border profiles 5, these cutouts, in the simplest case, having approximately semicylindrical outlines and together in pairs circumscribing a further passage—with a free gap—in the parting-joint plane. A further, for example essentially cylindrical, positively locking element, which bears, at its ends, on the wall webs of the cut-out border profiles 5, may then be inserted in this passage. This achieves an additional support against sheering along the parting joint T. During dismantling, the insert element can simply be driven out. If it has an enlarged diameter within the free box space of the border profiles 5, its end-side collars could additionally support the border profiles against sheering forces. Such a form, however, will only be used, where, during dismantling, the components connected thereto do not have to be drawn out perpendicularly with respect to the main surface.

If, then, a body of the abovedescribed construction is to be dismantled, or an individual component is to be released from the interconnected arrangement, for example for repair purposes, then, once the covering strip has been removed, the locking rings have to be destroyed.

Thereafter, the locking-ring bolt 12 can be driven out inwards from the passage in the direction of its upset head. If this is carried out at all the joining locations of a modular component, then the latter can be drawn out by suitable means perpendicularly with respect to the direction in which its surface area extends. Of course, suitable supporting measures have to be taken within the body beforehand.

It is thus also possible in a short period of time, to install a new component, of corresponding dimensions, in place of an old component which may, for example, be in need of repair. In this manner, a vehicle which, for example after slanting collision, has only sustained slight sheet-metal damage can be brought back into circulation more quickly than has been possible with the conventional repair methods.

We claim:

1. A modular structure for forming a railway vehicle carriage body, comprising:

a shell, a plurality of laterally space apart frame profiles forming bearing surfaces for the shell;

at least one border profile located on a border of said shell and connected to an end of at least one of said frame profiles to form a T-shaped structure, a half of an aperture being provided at a juncture of the border profile and said at least one frame profile, said half of said aperture being configured to join another half of said aperture on another of said modular structure and to receive connecting means extending through said aperture, a frame foot connected at the juncture of the border profile and said at least one frame profile for positive locking between the border profile and the at least one frame profile, said frame foot being configured for positive locking with another of said frame foot on said another modular structure at said aperture.

2. The invention of claim 1; wherein, stringer profiles are further provided, and said frame profiles overlap said stringer profiles, with clearances provided between the frame profiles and the stringer profiles.

3. The invention of claim 2; wherein, the shell is fastened to at least one of the profiles by rivets.

4. The invention of claim 1; wherein, the shell is formed of corrosive resistant sheet steel.

5. The invention of claim 1; wherein, the border profile is formed of fiber reinforced plastic.

6. The invention of claim 5; wherein, said fiber reinforced plastic is carbon fiber reinforced plastic.

7. The invention of claim 1; wherein, said border profile has a box-shaped cross-section and an extending rib, said rib having a free end connected to said shell.

8. The invention of claim 7; wherein, a border of said shell is bent into a Z-shape corresponding to a surface of said box-shaped cross-section and a surface of said extending rib.

9. The invention of claim 8; wherein, the shell is adapted to receive a protective film to cover rivet heads to be applied to the shell.

10. The invention of claim 1; wherein, the end of said at least one frame profile is a rectangular tube receiving a stub of the frame foot.

11. The invention of claim 10; wherein, the frame foot is casted, and are welded to said frame profiles.

12. The invention of claim 1; wherein, the frame profiles are provided weight-reducing apertures.

13. The invention of claim 12; wherein, the weight reducing apertures are triangles with rounded corners.

14. A method for forming the modular structure of claim 1, comprising the steps of:

cutting said plurality of frame profiles to a predetermined lengths, cutting a plurality of such border profiles, and forming said half of said aperture on each of said border profiles at a location of said juncture, assembling said border profiles, said frame profiles, and said frame foot by cold forking, providing said shell with parallel sides and connecting said shell to said border profiles, said frame profiles and said frame foot by cold working.

15. The method of claim 14, further comprising a step of cold forming the modular structure into a predetermined shape.

16. The method of claim 14, further comprising a step of forming weight-reducing apertures on the frame profiles.

17. The method of claim 16, further comprising a step of locating said weight-reducing apertures in a manner to form a lattice pattern on the frame profiles.

18. The method of claim 14, further comprising a step of forming cutouts on parts of the frame profiles that face the shell, for allowing insertion of stringer profiles.

19. The method of claim 14, further comprising a step of shaping said shell to form a Z-shape at the border of said shell.

* * * * *